(12) United States Patent
Motoya et al.

(10) Patent No.: US 11,507,797 B2
(45) Date of Patent: Nov. 22, 2022

(54) INFORMATION PROCESSING APPARATUS, IMAGE RECOGNITION APPARATUS, AND PARAMETER SETTING METHOD FOR CONVOLUTIONAL NEURAL NETWORK

(71) Applicant: Hitachi, Ltd., Tokyo (JP)

(72) Inventors: Toru Motoya, Tokyo (JP); Goichi Ono, Tokyo (JP); Hidehiro Toyoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1239 days.

(21) Appl. No.: 15/881,056

(22) Filed: Jan. 26, 2018

(65) Prior Publication Data
US 2018/0247182 A1 Aug. 30, 2018

(30) Foreign Application Priority Data
Feb. 27, 2017 (JP) .............................. JP2017-034348

(51) Int. Cl.
*G06N 3/04* (2006.01)
*G06N 3/08* (2006.01)
(Continued)

(52) U.S. Cl.
CPC ............. *G06N 3/04* (2013.01); *G06K 9/6265* (2013.01); *G06K 9/6285* (2013.01);
(Continued)

(58) Field of Classification Search
CPC ........ G06N 3/04; G06N 3/0454; G06N 3/063; G06N 3/08; G06K 9/00973; G06K 9/4604;
(Continued)

(56) References Cited

U.S. PATENT DOCUMENTS

2005/0065990 A1* 3/2005 Allen .................. G06F 9/45504
708/495
2009/0192958 A1* 7/2009 Todorokihara ........... G06N 3/10
706/27
(Continued)

FOREIGN PATENT DOCUMENTS

JP    2013-69132 A    4/2013

OTHER PUBLICATIONS

Lin, Darryl, Sachin Talathi, and Sreekanth Annapureddy. "Fixed point quantization of deep convolutional networks." International conference on machine learning. PMLR, 2016. (Year: 2016).*

*Primary Examiner* — Li B. Zhen
*Assistant Examiner* — Moriam Mosunmola Godo
(74) *Attorney, Agent, or Firm* — Crowell & Moring LLP

(57) ABSTRACT

An information processing apparatus having an input device for receiving data, an operation unit for constituting a convolutional neural network for processing data, a storage area for storing data to be used by the operation unit and an output device for outputting a result of the processing. The convolutional neural network is provided with a first intermediate layer for performing a first processing including a first inner product operation and a second intermediate layer for performing a second processing including a second inner product operation, and is configured so that the bit width of first filter data for the first inner product operation and the bit width of second filter data for the second inner product operation are different from each other.

13 Claims, 15 Drawing Sheets

(51) Int. Cl.
   *G06K 9/62*         (2022.01)
   *G06N 3/063*        (2006.01)
   *G06V 10/44*        (2022.01)
   *G06V 10/56*        (2022.01)
   *G06V 10/94*        (2022.01)
(52) U.S. Cl.
   CPC ........... *G06N 3/0454* (2013.01); *G06N 3/063* (2013.01); *G06N 3/08* (2013.01); *G06V 10/44* (2022.01); *G06V 10/454* (2022.01); *G06V 10/56* (2022.01); *G06V 10/94* (2022.01)
(58) Field of Classification Search
   CPC .. G06K 9/4628; G06K 9/4652; G06K 9/6265; G06K 9/6285; G06K 9/00281; G06F 17/11
   See application file for complete search history.

(56) References Cited

U.S. PATENT DOCUMENTS

| | | | | |
|---|---|---|---|---|
| 2011/0239032 | A1* | 9/2011 | Kato ....................... | G06N 3/063 713/500 |
| 2016/0026912 | A1* | 1/2016 | Falcon .................. | G06N 3/0454 706/25 |
| 2016/0148078 | A1* | 5/2016 | Shen ........................ | G06K 9/66 382/158 |
| 2016/0245652 | A1* | 8/2016 | Haneda .............. | G01C 19/5614 |
| 2016/0328647 | A1* | 11/2016 | Lin ......................... | G06N 3/063 |
| 2016/0342892 | A1* | 11/2016 | Ross ...................... | G06N 3/063 |
| 2017/0032222 | A1* | 2/2017 | Sharma ................ | G06K 9/4619 |

* cited by examiner

FIG. 1A
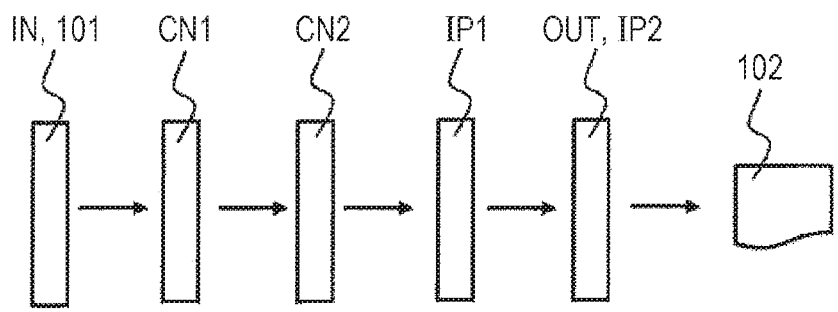
FIG. 1B
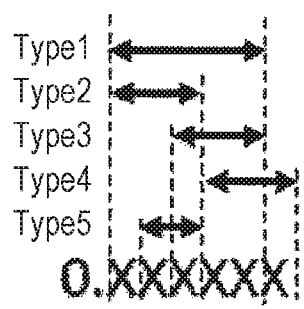
FIG. 1C
| | | CN1 | CN2 | IP1 | IP2 | TOTAL |
|---|---|---|---|---|---|---|
| COMPARATIVE EXAMPLE | DATA TYPE | Type1 (6bit) | | | | |
| | DATA CAPACITY | 3Kbit | 1.5Kbit | 2.4Mbit | 30Kbit | 2.4Mbit |
| EMBODIMENT | DATA TYPE | Type2 (4bit) | Type3 (4bit) | Type4 (4bit) | Type5 (3bit) | |
| | DATA CAPACITY | 2Kbit | 1Kbit | 1.6Mbit | 15Kbit | 1.6Mbit |

INFORMATION PROCESSING APPARATUS, IMAGE RECOGNITION APPARATUS, AND PARAMETER SETTING METHOD FOR CONVOLUTIONAL NEURAL NETWORK

BACKGROUND OF THE INVENTION

1. Field of the Invention

The present invention relates to a circuit for processing information with high reliability.

2. Description of the Related Art

In recent years, it has been noted that a high recognition rate can be achieved by using a convolutional neural network for general image recognition (see, for example, JP 2013-69132 A). General image recognition means classification and identification of the types of objects in an image. The convolutional neural network is a machine learning technique that performs multiple feature amount extraction and can achieve a high recognition rate by combining multiple layers of perceptrons that extract the feature amount of input information.

The reason why the fact the convolutional neural network is particularly effective in machine learning algorithms has become clear recently, is because the performance of computers has been improved. In order to achieve a high recognition rate in the convolutional neural network, it is necessary to train and optimize filter data of the intermediate layer perceptron by using thousands/tens of thousands of pieces of image data. By increasing the number of pieces of data in the filter data, it becomes possible to achieve detailed classification and a high recognition rate of the images. Accordingly, high computational performance is required to train a large amount of filter data using a large number of images, and due to the development of computers such as a multi-core technology and a technology in general-purpose computing on graphics processing units (GPGPU) in a server in recent years, it has become possible to perform general image recognition by the convolutional neural network.

Since the effectiveness of the convolutional neural network has been widely recognized, the study of convolutional neural networks is explosively widespread and various applications are now under study. An example is the use of the convolutional neural network to recognize surrounding objects in the development of automotive self-driving technology.

SUMMARY OF THE INVENTION

However, for built-in use in automobiles or the like, the computational performance of the semiconductor chip is very limited compared to server environments. For this reason, there is a problem that the capacity of the storage area is insufficient to mount all of a large amount of filter data necessary for achieving the recognition rate, in order to implement the convolutional neural network for such a built-in use. Therefore, an object of the present invention is to develop an image recognition apparatus capable of incorporating all of the filter data to be built in without reducing the recognition accuracy of the convolutional neural network.

One aspect of the present invention is an information processing apparatus having an input device for receiving data, an operation unit for constituting a convolutional neural network for processing data, a storage area for storing data to be used is the operation unit, and an output device for outputting the result of the processing. The convolutional neural network includes a first intermediate layer that performs a first processing including a first inner product operation and a second intermediate layer that performs a second processing including a second inner product operation, and is configured so that the bit width of first filter data for the first inner product operation and the bit width of second filter data for the second inner product operation are different from each other.

Another aspect of the present invention is an image recognition apparatus that includes an input device for receiving an image, an operation unit for processing the image, a storage area for storing data to be used in the operation unit, and an output device for outputting the result of the processing so as to classify and identify the types of objects in the image. The operation unit has a plurality of hierarchical layers for an convolutional operation of filters for extracting a feature amount of the image for image processing, and in the subsequent hierarchical layer, an convolutional operation is further applied to the result of the convolutional operation obtained in the previous hierarchical layer, and the data type of the filter data to be used for the convolutional operation is determined for each hierarchical layer so as to include at least two different data types.

Further another aspect of the present invention is a parameter setting method of a convolutional neural network that accepts data, processes the data, and outputs the result of the processing, and that includes a first intermediate layer for performing a first inner product operation and a second intermediate layer for performing a second inner product operation. This method includes a parameter setting process for independently setting the bit width of first filter data for the first inner product operation and the bit width of second filter data for the second inner product operation.

According to the present invention, the data amount of the filter data to be stored in the storage area can be reduced. The problems, configuration, and effects other than those described above are apparent from the description of the following embodiments.

BRIEF DESCRIPTION OF THE DRAWINGS

FIG. 1A is a conceptual diagram showing the configuration of a convolutional neural network in an embodiment;

FIG. 1B is a conceptual diagram showing an example of definition of a data type in the embodiment;

FIG. 1C is a table comparing a data type and a data capacity in the embodiment with those of a comparative example;

DESCRIPTION OF THE PREFERRED EMBODIMENTS

Figure 2:
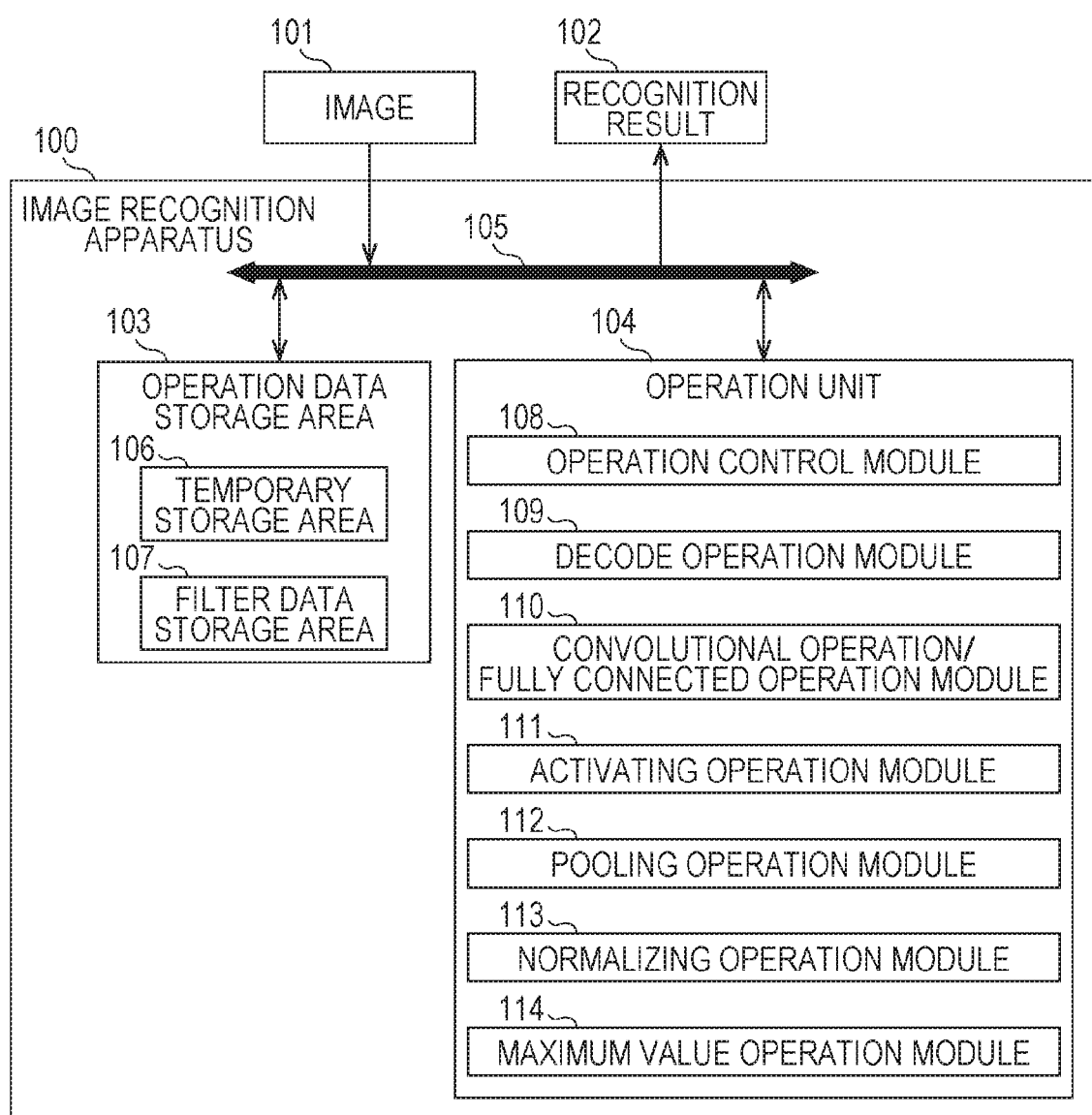
FIG. 2 is a block diagram showing a configuration of an image recognition apparatus 100 is the first embodiment.

Hereinafter, an embodiment will be described with reference to the drawings. In all the drawings that illustrate the embodiments, the same reference numerals are given to members having the same function, and the repeated description is omitted except for special cases of necessity.

An example of the embodiment described below is a convolutional neural network with a plurality of intermediate layers, and the data type of the filter data is changed in each intermediate layer to make the bit width variable. The bit width of the data type is determined by evaluating the operational precision of the filter data that can maintain the recognition rate of the convolutional neural network.

FIG. 1A is a diagram showing the concept of the processing of the convolutional neural network in the embodiment. In the present embodiment, described is a configuration example of the network, in which the network parameter is not reduced uniformly in the whole network, and instead, an effective accuracy of the network parameter is determined for each hierarchical layer to keep only the effective accuracy. In the following embodiments, the processing object is image data, but is not limited thereto.

The convolutional neural network in the present embodiment is assumed to have an input layer IN, a first convolution layer CN1, a second convolution layer CN2, a fully connected layer IP1, and an output layer OUT. The number of layers can be freely changed. The types of layers are not limited to those described above, and the present embodiment can be applied when a parameter is used for the processing. The input layer IN is an image 101 to be input, which is normalized. And the output layer OUT is assumed to be the second fully connected layer IP2. Incidentally, the convolution layer is usually accompanied by a pooling layer or an activation layer, but these layers are omitted here. In this convolutional neural network, the image 101 is input and a recognition result 102 is output.

The convolution layer extracts the information (feature amount) necessary for recognition from the image 101 having been input. The convolution layer uses the parameter data (filter data) to perform the convolution processing necessary for extracting a feature amount (a kind of inner product operation for filtering). The pooling layer summarizes information obtained in the convolution layer and increases the invariance of the position in the case of image data.

The fully connected layers IP1 and IP2 use the extracted feature amount to determine which category the image belongs to, that is, to classify the patterns. Each fully connected layer constitutes one layer of a multi-layer perceptron. Conceptually, it is conceivable that a plurality of units are arranged in a row in one fully connected layer. One unit is connected with all the units of the previous fully connected layer. The parameter (weight data) is assigned to each connection. The input into the unit of the subsequent fully connected layer is made by adding a predetermined bias to the inner product of the input of the previous fully connected layer and the weight data. In the present specification, such filter data, weight data, and biases are collectively referred to as filter data. In the present embodiment, the data type of the filter data is changed in each layer constituting the neural network so that a different bit width is used.

FIG. 1B is a conceptual diagram showing a state in which a bit width is defined for each type. As an example, Type 1 has a total of 6 bits including 5 bits for digits after the decimal point and 1 bit for the sign. Likewise, Type 2 is defined as 3 bits just after the decimal point, Type 3 is defined as 3 bits from the third digit after the decimal point, Type 4 is defined as 3 bits from the fourth digit after the decimal point, and Type 5 is defined as 2 bits from the second digit after the decimal point. In the following embodiments, the bit width of each layer is selected according to the necessary operational precision.

FIG. 1C is a table showing the difference in data capacity between an example using different bit width in each layer shown in FIG. 1A and an example using the same bit width by reducing data uniformly. By using different bit width in each layer, it is expected to be able to reduce the data capacity.

How to determine the bit width in each layer is as follows: (A) since high accuracy is required for a layer having a large number of parameters required for operation, the operational precision is relatively increased, (B) since the necessary operational precision decreases naturally as the operation proceeds through the hierarchical layers of the network, the operational precision is relatively reduced, and (C) since the layer that performs object edge detection does not require much image gradation, the operational precision is relatively reduced, while at the layer that detects an object using color information, the operational precision is relatively increased, and so on. Further the following embodiments also describe a method for determining the data type by providing feedback of the recognition accuracy. In this method, the effective accuracy of the network parameters is obtained for each hierarchical layer, and the data type is determined in consideration of the effective accuracy.

First Embodiment

FIG. 2 shows the configuration of an image recognition apparatus 100 in the present embodiment. The input of the image recognition apparatus 100 is the image 101, and the output is the recognition result 102 of the image 101. The image recognition apparatus 100 has an operation data storage area 103 and an operation unit 104, and an input port, an output port, the operation data storage area 103, and the operation unit 104 are all connected by a bus 105, and then the operation data is transferred through the bus 105.

The inside of the operation data storage area 103 is composed of a temporary storage area 106 and a filter data storage area 107. A halfway result of an operation performed by the image recognition apparatus 100 is stored in the temporary storage area 106. The filter data of the intermediate layer of the convolutional neural network is stored in the filter data storage area 107 in advance.

The operation unit 104 is constituted by an operation module necessary for operation of the convolutional neural network.

An operation control module 108 is a module that controls other operation modules and the flow of operation data in accordance with an algorithm of the convolutional neural network.

A decode operation module 109 is a module that decodes the filter data compressed and stored in the filter data storage area. Details will be described later.

A convolutional operation/fully connected operation module 110 is a module that performs convolutional operation or fully connected operation in the convolutional neural network. The convolutional operation and fully connected operation can be performed in a single module because the contents are both inner product operations. Even if there are a plurality of convolution layers or fully connected layers, one convolutional operation/fully connected operation module 110 can execute the operation.

An activating operation module 111 is a module that performs operations of the activation layer in the convolutional neural network.

A pooling operation module 112 is a module that performs operations of the pooling layer in the convolutional neural network.

A normalizing operation module 113 is a module that performs operations of the normalizing layer in the convolutional neural network.

A maximum value operation module 114 is a module for detecting the maximum value of the output layer in the convolutional neural network to obtain the recognition result 102. The modules which are involved deeply with the contents of the present embodiment among these operation modules are the decode operation module 109 and the convolutional operation/fully connected operation module 110, which will be described in detail later on.

For built-in use on a vehicle or the like, for example, the image recognition apparatus 100 can be constituted by a semiconductor integrated circuit such as a field-programmable gate array (FPGA). This semiconductor integrated circuit is composed of one chip for example, and performs mainly processing for images in cooperation with a general-purpose central processing unit (CPU). The operation data storage area 103 is a semiconductor memory, and a high-speed memory such as static random access memory (SRAM) can be used for example. Also, the image recognition apparatus 100 may not be an FPGA and may be configured to execute a program stored in a storage device by the CPU so as to perform a predetermined processing in cooperation with other hardware. In the present embodiment, the image recognition processing is described as an example, but the present embodiment can be used for other processing, and its application is not particularly limited.

When the image recognition apparatus 100 is configured by an FPGA, the operation data storage area 103 is composed of an SRAM and the operation unit 104 is composed of a programmable logic cell, for example. The data for the program is loaded from an external storage device (not shown), such as a flash memory to an area called the configuration memory (not shown) of the operation data storage area 103 to set the logic cell to achieve each module of the operation unit.

Figure 3:
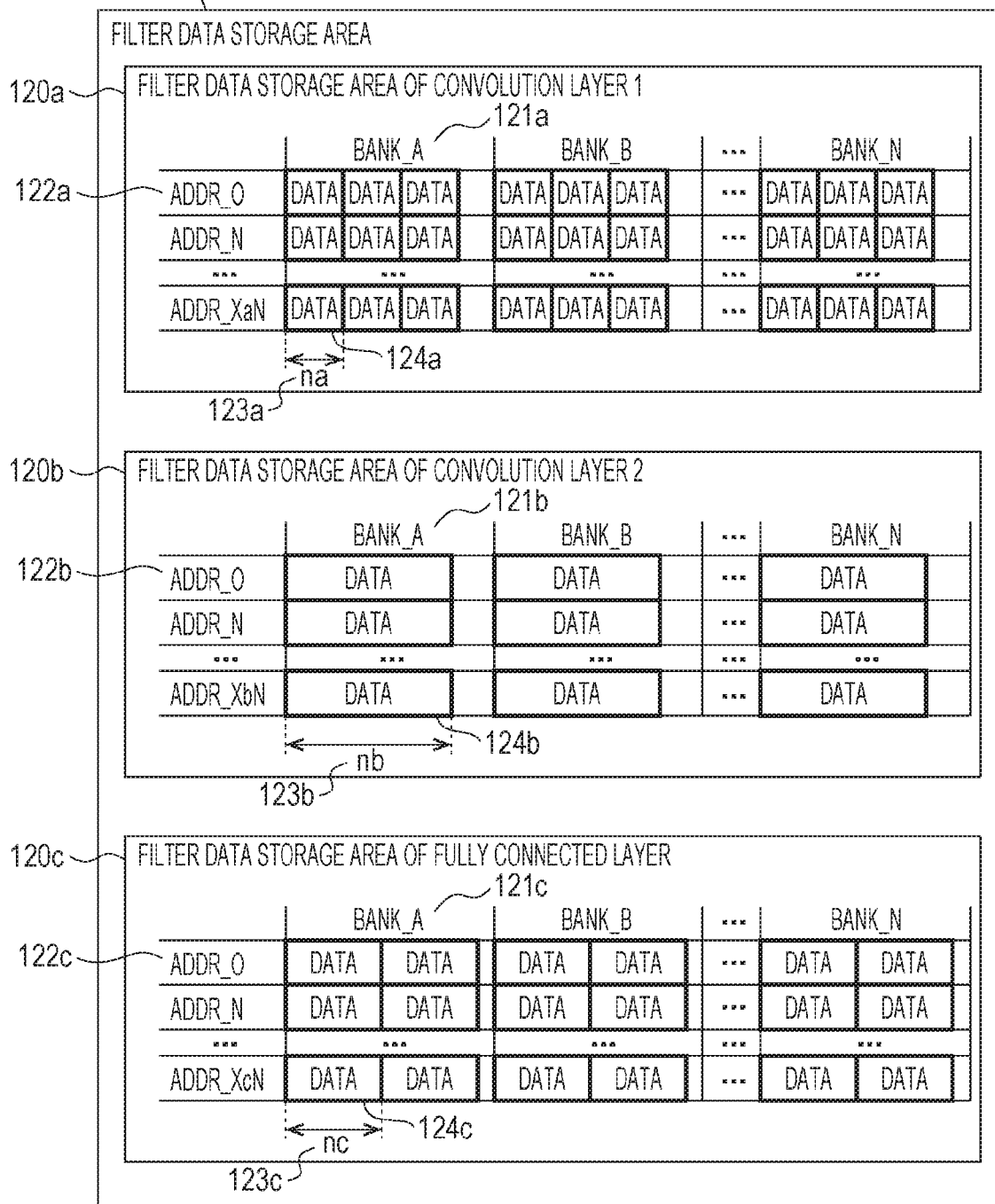
FIG. 3 is a conceptual diagram showing a configuration of a filter data storage area 107 in the first embodiment.

FIG. 3 is a diagram showing the configuration of the filter data storage area 107 in the present embodiment. In the filter data storage area, the filter data of the convolution layer and the fully connected layer of the intermediate layer in the convolutional neural network are stored in advance. In the present embodiment, the convolutional neural network is assumed to have two convolution layers and one fully connected layer. The filter data storage area 107 includes a filter data storage area 120a of the convolution layer 1, a filter data storage area 120b of the convolution layer 2, and a filter data storage area 120c of the fully connected layer.

Each of the filter data storage areas 120 is divided internally by banks 121, and the address numbers are allocated by addresses 122. The configuration of these banks 121 and the allocation of the addresses 122 depend on the physical configuration of the image recognition apparatus 100 and are common in the filter data storage area 107. On the other hand, bit width 123 of filter data 124 stored in each of the filter data storage areas 120 is different.

With regard to filter data 124a in the filter data storage area 120a of the convolution layer 1, three pieces of the filter data can be stored in one address, while one piece of filter data 124b in the filter data storage area 120b of the convolution layer 2 is stored in one address, and two pieces of filter data 124c in the filter data storage area 120c of the full connected layer can be stored in one address. This is because the operational precision required for operation of each intermediate layers is evaluated and only the bit width 123 satisfying the operational precision is stored. This operational precision may be different for each of the convolution layer 1, convolution layer 2, and fully connected layer. If the data type of the filter data is determined without evaluating operational precision, the data type of the bit width that suits the bit width of the address will be used. If a data type capable of storing one piece of data per one address is used, a triple storage area in the convolution layer 1 and a double storage area in the fully connected layer are required. By evaluating necessary operational precision in each intermediate layer separately for each layer, only the necessary bit width can be stored and the storage space is saved.

Figure 4:
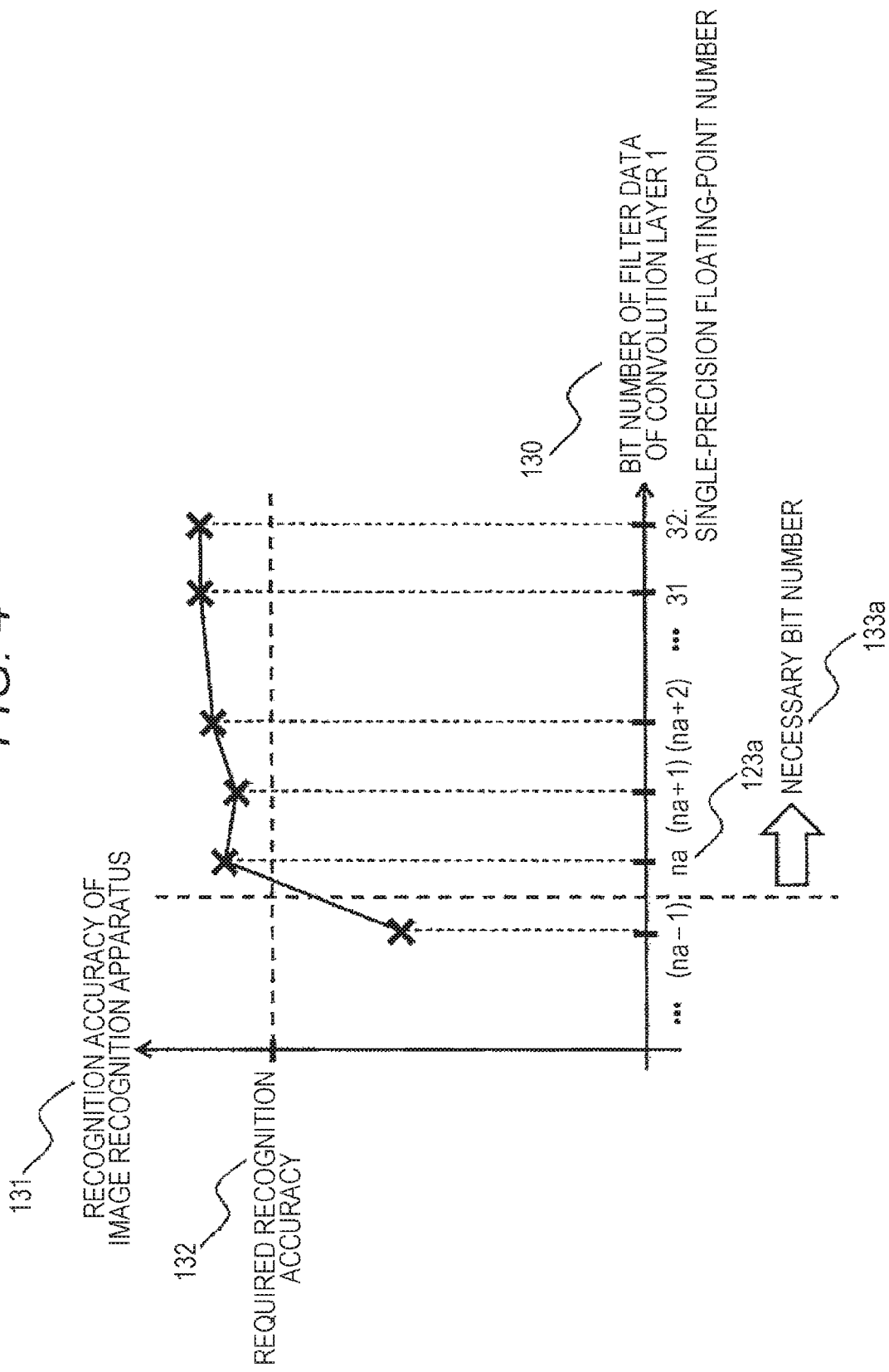
FIG. 4 is a graph showing the relationship between the number of bits of filter data of a convolution layer and recognition accuracy of the image recognition apparatus in the first embodiment.

FIG. 4 is a diagram showing the relationship between a bit number 130 of the filter data of the convolution layer 1 and recognition accuracy 131 of the image recognition apparatus in the present embodiment. The horizontal axis represents the bit number 130 of the filter data of the convolution layer 1 and the vertical axis represents the recognition accuracy 131 of the image recognition apparatus. In the learning stage of the convolutional neural network, training of the filter data is performed so that the recognition accuracy of the image recognition apparatus 100 exceeds required recognition accuracy 132 required by the application. In this case, it is common to use a 32 bit wide single-precision floating-point number for the data type of the filter data. This is because the learning algorithm of the convolutional neural network uses a minute value, such as the derivative value of the filter data.

However, when a convolutional neural network is mounted in the image recognition apparatus 100, the operational precision is surplus when using the same 32 bit wide single-precision floating-point number as that used for learning as the data type of the filter data.

As shown in FIG. 4, even if the filter data bit number 130 of the convolution layer 1 is reduced to 32 bits, 31 bits, . . . , (na+2) bit, (na+1) bit, na bit, the recognition accuracy of the image recognition apparatus 100 does not become lower than the required recognition accuracy 132 required by the application. If the recognition accuracy of the image recognition apparatus 100 becomes lower than the required recognition accuracy 132 of the application for the first time when the filter data bit number is reduced from na bits to (na−1 bits, it is understood that a necessary bit number 133a of the filter data bit number 130 of the convolution layer 1 is na bit. Therefore, it is necessary that the filter data bit number 130 of the convolution layer 1 should be equal to or more than na bits, and it is appropriate that an operation bit width 123a of the filter data 124a in the filter data storage area 120a of the convolution layer 1 should be na bits.

Figure 5:
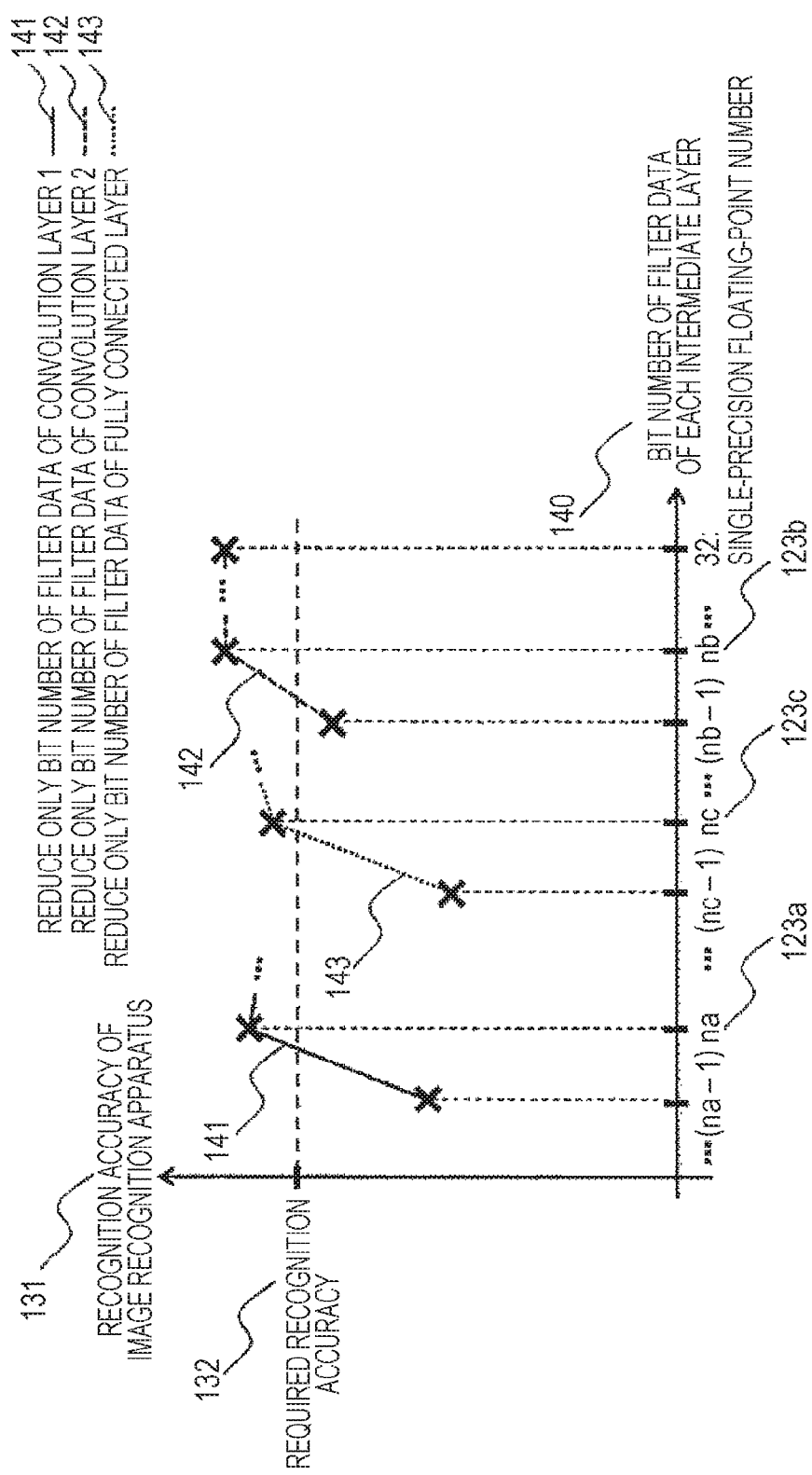
FIG. 5 is a graph showing the relationship between the number of bits of the filter data of each intermediate layer and the recognition accuracy of the image recognition apparatus in the embodiment.

FIG. 5 is a diagram showing the relationship between a bit number 140 of the filter data of each intermediate layer and the recognition accuracy 131 of the image recognition apparatus in the present embodiment. In this diagram, three graphs are drawn, which are a graph 141 showing reduction of only the bit number of the filter data of the convolution layer 1, a graph 142 showing reduction of only the bit number of the filter data of the convolution layer 2, and a graph 143 showing reduction of only the bit number of the filter data of the fully connected layer. The graph 141 showing reduction of only the bit number of the filter data of the convolution layer 1, is shown by abbreviating the same as the graph shown in FIG. 4.

The graph 142 showing reduction of only the bit number of the filter data of the convolution layer 2 is a graph showing the change of recognition accuracy 131 of the image recognition apparatus when the number of bits of the filter data is reduced in only the filter data of the convolution layer 2 in the same way as that of the convolution layer 1. The recognition accuracy 131 of the image recognition apparatus exceeds the required recognition accuracy 132 of the application when the bit number of the filter data of the convolution layer 2 has not reach nb bits, but is lower when the bit number is (nb−1) bits. Therefore, the number of bits of the filter data of the convolution layer 2 needs to be nb bits or more, and an operation bit width 123b of the filter data 124b in the filter data storage area 120b of the convolution layer 2 is set to be nb bits.

Similarly, when the graph 143 showing reduction of only the bit number of the fully connected filter data is focused on, the recognition accuracy 131 of the image recognition apparatus is higher than the required recognition accuracy 132 when the number is nc bits and is lower when (nc−1) bits. Therefore, the number of bits of the filter data in the fully connected layer must be nc bits or more, and an operation bit width 123c of the filter data 124c in the filter data storage area 120c of the fully connected layer is set to nc bit. It is true that the operation bit widths na, nb and nc of respective intermediate layers do not always coincide with each other, and when the filter data is stored in the filter data storage area 107 of the image recognition apparatus 100, the storage area can be efficiently used by storing the filter data in accordance with the sizes of the operation bit widths na, nb and nc of the respective intermediate layers.

Figure 6:
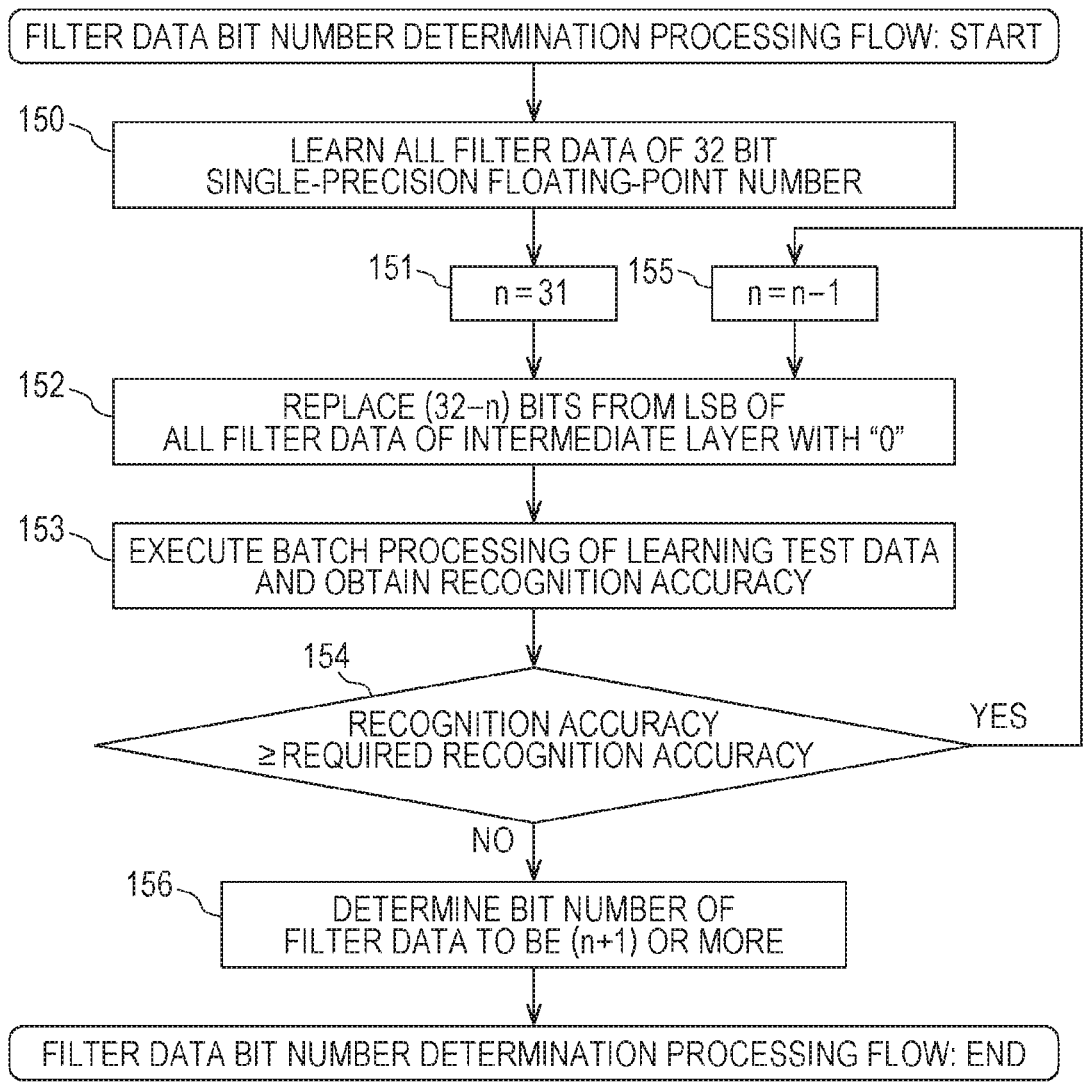
FIG. 6 is a flowchart showing a processing flow for determining the number of bits of the filter data of each intermediate layer in the embodiment.

FIG. 6 is a diagram showing a processing flow for determining the number of bits of the filter data of each intermediate layer in the present embodiment. In this flow, first the filter data of the predetermined hit number (for example, 32 bits) is learned in a normal way, and then the number of bits in the filter data of each intermediate layer is reduced to check whether the required recognition accuracy can be maintained. Then, the number of bits in the filter data of each intermediate layer is set to a number of bits as small as possible that can maintain the required recognition accuracy. For this purpose, the processing shown in FIG. 6 is performed in each layer.

Step 150: learn all of the filter data of 32 bit single-precision floating-point number in learning of the convolutional neural network.

Step 151: set the number of operation bits to n=31 bits.

Step 152: reduce the total number of operation bits in the filter data of the intermediate layer focused on to the operational precision. The (32−n) bits from the least significant bit (LSE) of the filter data of the 32 bit single-precision floating-point number data type obtained in step 150 are all set to "0". In this case, the method of rounding to the nearest point is used as the rounding method of the filter data.

Step 153: seek the recognition accuracy of the convolutional neural network in which the number of operation bits in the intermediate layer being focused on is reduced. Obtain recognition accuracy by performing recognition of all image data defined as learning test data by batch processing.

Step 154: proceed to step 155 when the recognition accuracy obtained in step 153 is greater than or equal to the required recognition accuracy 132 of the application and the number of operation bits is not 0. Otherwise, proceed to step 156.

Step 155: set n=n−1 to reduce the number of operation bits by 1 bit.

Step 156: since the required recognition accuracy 132 is not satisfied at n bits, the number of bits of the filter data is determined to be (n+1) bits or more.

Figure 7:
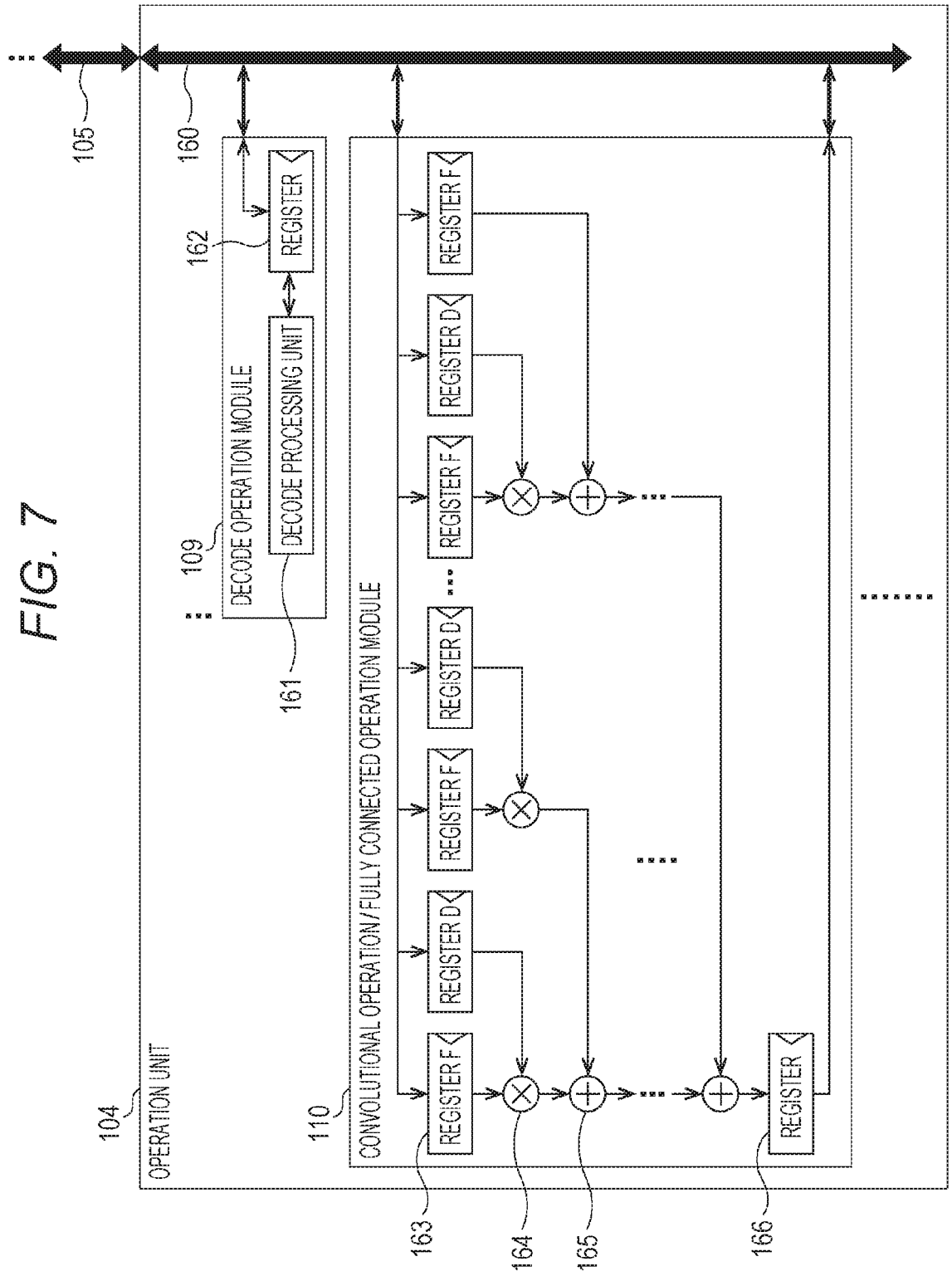
FIG. 7 is a block diagram showing the configurations of a decode operation module and a convolutional operation/fully connected operation module in an operation unit in the embodiment.

FIG. 7 is a diagram showing the configuration of the decode operation module 109 and the convolutional operation/fully connected operation module 110 in the operation unit 104 in the present embodiment. The operation unit 104 includes a plurality of convolutional operation/fully connected operation modules 110 to form one layer as a whole. There is also a bus 160 that connects operation modules to each other, and is used to exchange operation data between respective operation modules. The bus inside the operation unit 104 is connected to the bus 105 inside the image recognition apparatus 100, and can exchange the operation data with the operation data storage area 103. Among the convolutional operation/fully connected operation modules 110, one module can be used as a different intermediate layer by changing the data stored in an input register 163 to change the parameters. Incidentally, there may be more than one module.

The decode operation module 109 has a register 162 for temporarily storing the filter data therein and a decode processing unit 161 for decoding the filter data. The convolutional operation/fully connected operation module 110 is an operation module for performing an inner product operation, and has the input registers 163, multipliers 164, adders 165, and an output register 166. The total number of the input registers 163 is odd number (2N+1) and the registers 163 include registers F holding the filter data and registers D holding the operation result of the previous layer. The input registers 163 are connected to the bus 160 in the operation unit 104 and receive and hold the input data from the bus 160. These input registers 163 except one are all connected to the input sections of the multipliers 164, and the remaining one is connected to the input section of the adder 165. With regard to the 2N input registers 163 connected to the input sections of the multipliers 164, the half number N+1 input registers 163 (the register F) receive and hold filter data of the intermediate layer and the remaining half N input registers 163 (the register D) receive and hold the operation halfway result stored in the temporary storage area 106 in the operation data storage area 103. The convolutional operation/fully connected operation module 110 has N multipliers and N adders. Each of the N multipliers calculates and outputs the product of the filter data and the operation halfway result. The N adders calculate the total sum of the results of the N multipliers and filter data of the one input register, and the result is stored in the output register 166. The operation data stored in the output register 166 is transferred to another storage area or operation module through the bus 160 in the operation unit 104.

Figure 8:
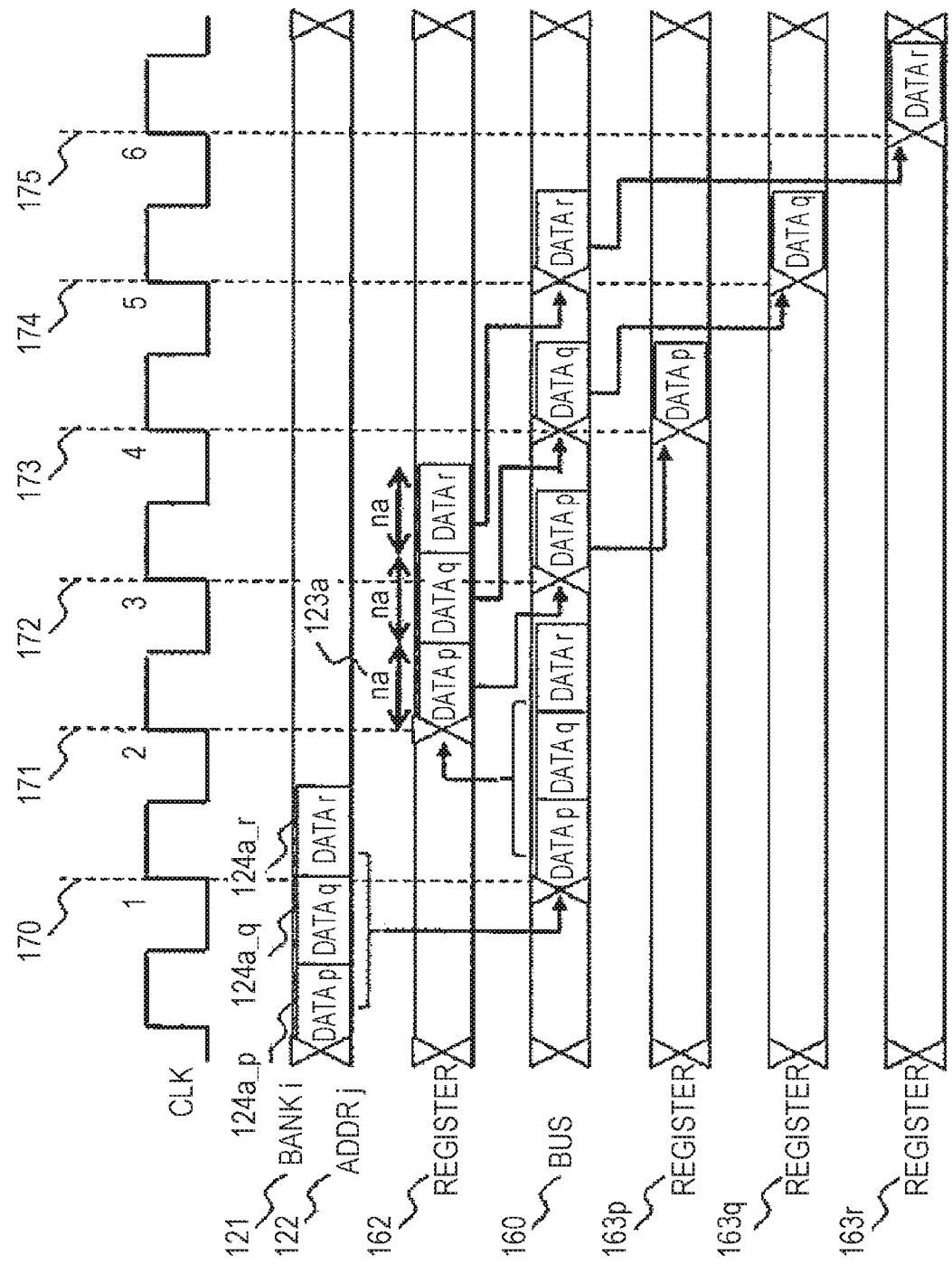
FIG. 8 is a timing chart showing a manner in which the decode operation module decodes the filter data of the convolution layer in the embodiment.

FIG. 8 is a timing chart showing the manner in which the decode operation module 109 in the present embodiment decodes the filter data 124a of the convolution layer 1. The data to be decoded in this timing chart is three pieces of filter data, which are data p 124a_p, data q 124a_q, and data r 124a_r stored in the 1-th address 122 in the i-th bank 121 of the filter data storage area 120a of the convolution layer 1 shown in FIG. 3.

First, the operation control module 108 in the operation unit 104 instructs to transfer the three pieces of filter data p, q, and r stored in the address 122 to the register 162 in the decode operation module 109. Thereby, the bus 160 in the operation unit is synchronized with the data stored in the address 122 in the first cycle 170, and the data in the register 162 in the decode operation module 109 and the data in the bus 160 are synchronized with each other in the second cycle 171.

The decode processing unit 161 in the decode operation module 109 detects that the na bits from the top is the first data p 124a_p using the information on the bit width 123a of the filter data 124a and transfers the data p 124a_p to an input register 163p in the convolutional operation/fully connected operation module 110 through the bus 160. In addition, the decode processing unit 161 detects that the na bits next to the data p 124a_p is the second data q 124a_q and further that the next neighboring na bits is the third data r 124a_r, and transfer each piece of the data to input registers 163q and 163r inside the convolutional operation/fully connected operation module 110. Thereby the bus 160 is synchronized with the data p 124a_p in the third cycle, the bus 160 and the input register 163p are synchronized with the data q 124a_q and the bus 160 respectively in the fourth cycle, the bus 160 and the input register 163g are synchronized with the data r 124a_r and the bus 160 respectively in the fifth cycle, and the input register 163r is synchronized with the bus 160 in the sixth cycle.

Information on the bit width used above is achieved by storing the data type information for each layer as shown in FIG. 1 in the operation data storage area 103 and by the decode operation module 109 referring to the stored data. Alternatively, the operation control module 108 may manage the information collectively. This information may also include the number m of pieces of filter data for the filter of each layer and the number n of pieces of corresponding filter data stored in one address. Further, this information may also contain information about the size of each register and the other management of the storage areas.

Figure 9:
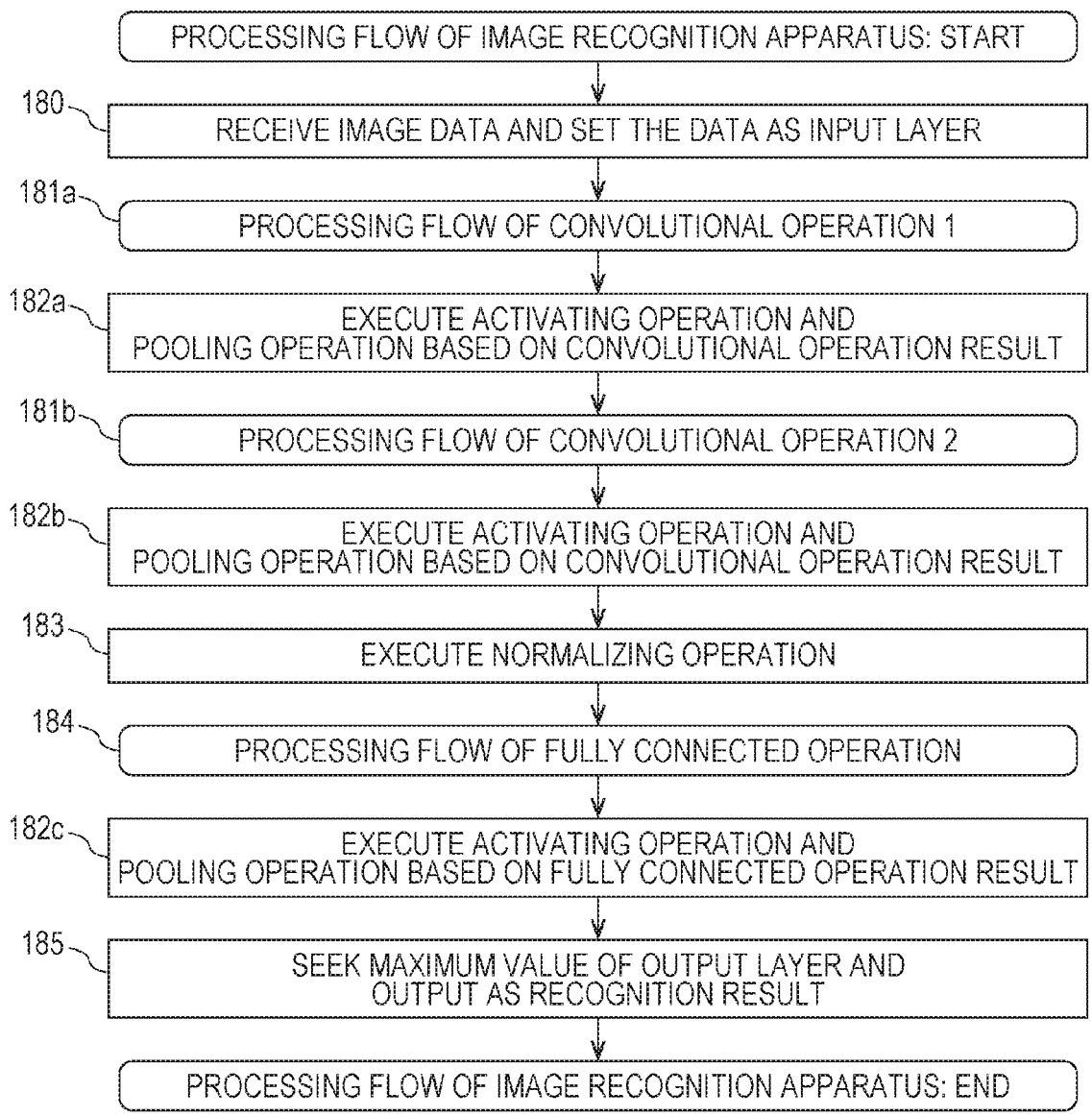
FIG. 9 is a flowchart showing the processing procedure of the image recognition apparatus in the embodiment.

FIG. 9 is a flowchart showing the processing procedure of the image recognition apparatus 100 in the present embodiment.

Step 180: the image recognition apparatus 100 receives the image 101, which is input data, and stores the data in the temporary storage area 106 inside the operation data storage area 103. The image data corresponds to the input layer IN is the convolutional neural network.

Step 181: extract a feature amount by the filter data by using the convolutional operation/fully connected operation module 110. The step corresponds to the convolution layer is the convolutional neural network. Details will be described later.

Step 182: apply the activating operation module 111 or the pooling operation module 112 to the result of the convolutional operation or the result of the fully connected operation stored in the temporary storage area 106 inside the operation data storage area 103. Perform an operation corresponding to the activation layer or the pooling layer in the convolutional neural network.

Step 183: apply the normalizing operation module to the intermediate layer data stored is the temporary storage area 106 inside the operation data storage area 103. Perform an operation corresponding to a normalizing layer in the convolutional neural network.

Step 184: extract a feature amount by the filter data by using the convolutional operation/fully connected operation module 110. This corresponds to the fully connected layer in the convolutional neural network. Details will be described later.

Step 185: seek the index of the element having the maximum value in the output layer, and output the index as the recognition result 102.

Figure 10:
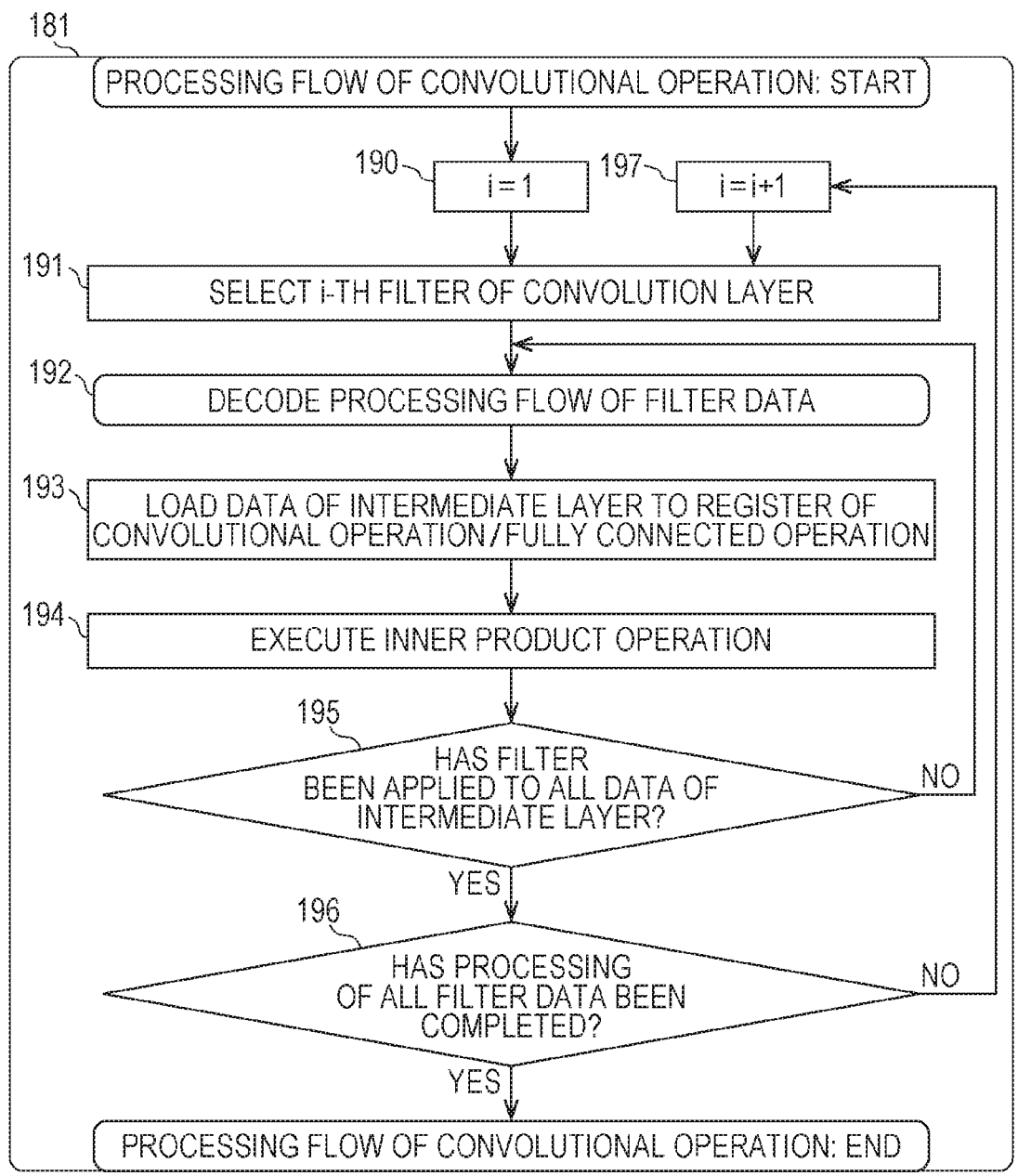
FIG. 10 is a flowchart showing the processing of a convolutional operation in the embodiment.

FIG. 10 is a diagram showing the processing flow 181 of the convolutional operation in the present embodiment.

Step 190: initialize the loop variable as i=1.

Step 191: select the i-th filter in the convolution layer.

Step 192: decode the filter data. Details will be described later.

Step 193: load the intermediate layer data stored in the temporary storage area 106 inside the operation data storage area 103 into the input register 163 of the convolutional operation/fully connected operation module 110.

Step 194: execute inner product operation using the convolutional operation/fully connected operation module 110. Store the output data kept inside the output register 166 in the temporary storage area 106 inside the operation data storage area 103.

Step 195: proceed to step 196 when the filter has been applied to all intermediate layer data. Otherwise, change the intermediate layer data to which the filter is to be applied and proceed to step 192.

Step 196: terminate the processing flow of convolutional operation when all the filter data has been processed. Otherwise proceed to step 197.

Step 197: update the loop variable as i=i+1.

Processing is performed for one convolution layer through the above processing.

Figure 11:
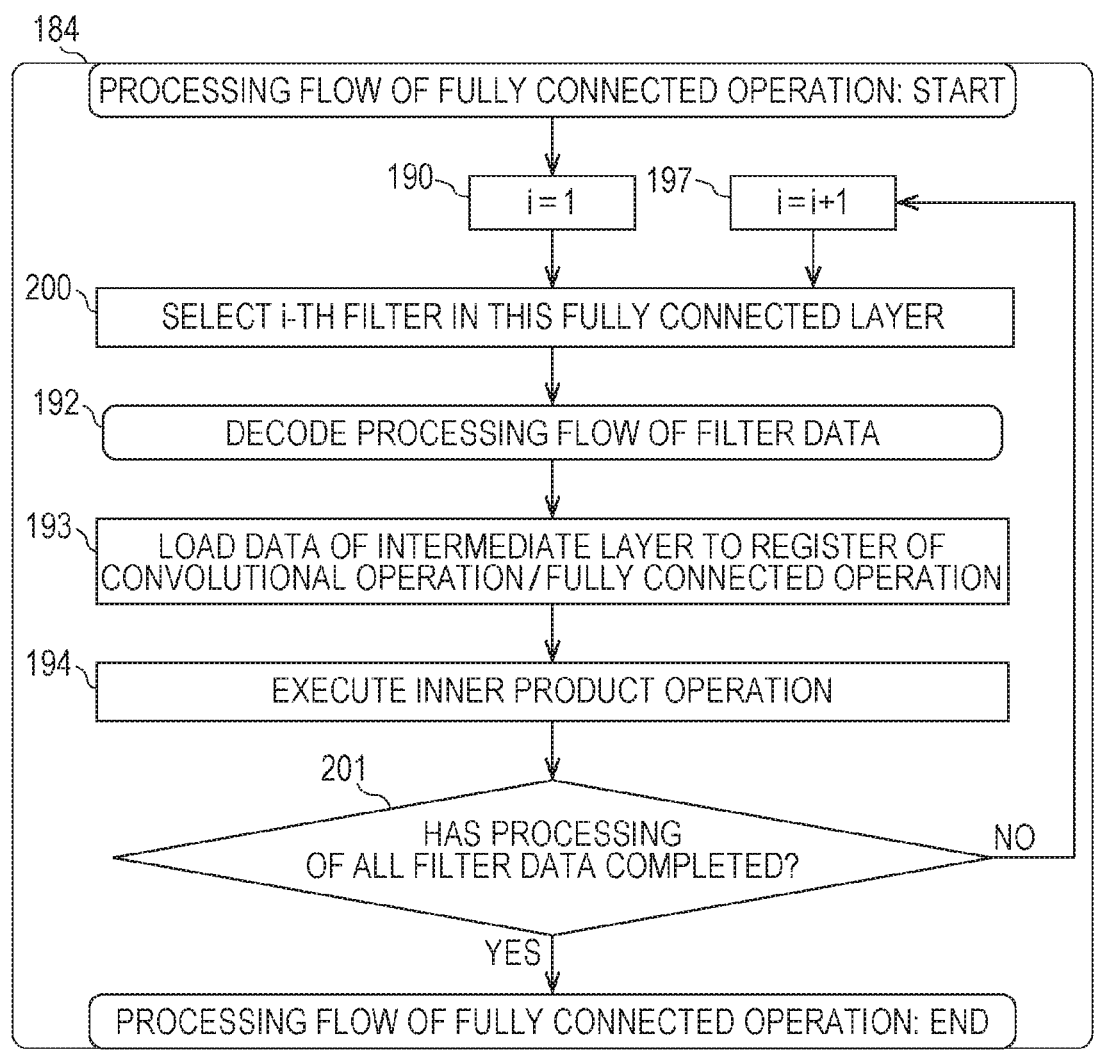
FIG. 11 is a flow chart showing the processing of a fully connected operation in the embodiment.

FIG. 11 is a diagram showing the processing flow 184 of the fully connected operation in the present embodiment. For the processing in FIG. 11, the same convolutional operation/fully connected operation module 110 as the module for the processing in FIG. 10 can be used, and the processing configuration is similar thereto. The same reference numerals are given to the same configurations essentially.

Step 200: select the i-th filter of the fully connected layers.

Step 201: terminate the processing flow of the fully connected operation when ail the filter data has been processed. Otherwise, proceed to step 197.

Processing for one fully connected layer is performed through the above processing.

Figure 12:
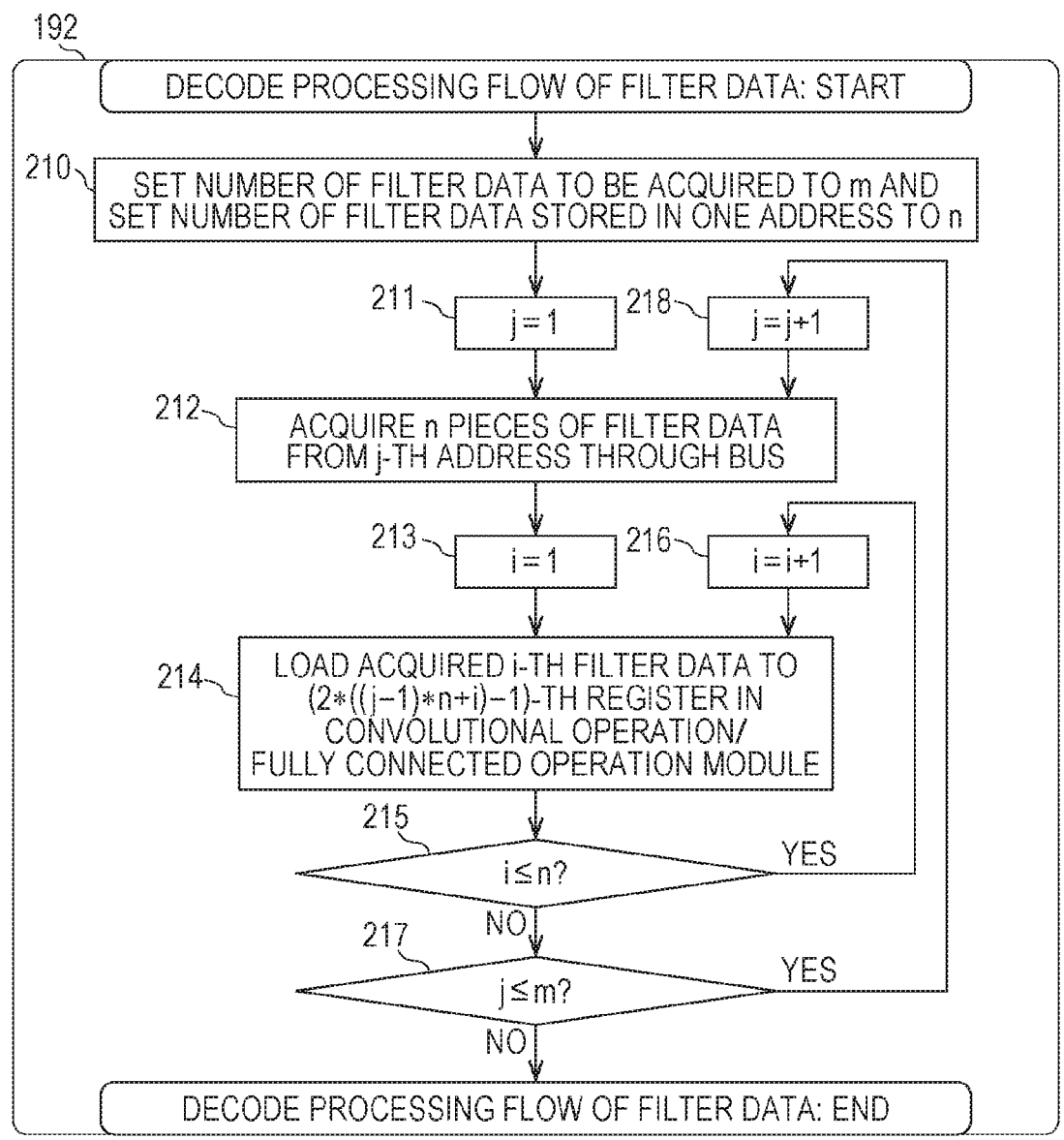
FIG. 12 is a flowchart showing decode processing of the filter data in the embodiment.

FIG. 12 is a diagram showing step 192 of the decode processing flow of the filter data in the present embodiment. The timing of this processing corresponds to that shown in FIG. 8. As a result of the step 192 of the decode processing flow, the storage of the filter data is completed in each of the registers F shown in FIG. 7.

Step 210: set the number of filter data to m referring to the number of pieces of filter data of the relevant filter, and set the number of filter data to n referring to the number of pieces of the corresponding filter data stored in one address.

Step 211: initialize outer loop variable j as j=1.

Step 212: the operation control module 108 transfers all the filter data stored in the j-th address to the register 162 in the decode operation module 109 through the bus 105 in the image recognition apparatus 100 and the bus 160 in the operation unit 104. Thus, the decode operation module 109 acquires n pieces of filter data.

Step 213: initialize inner loop variable i as i=1.

Step 214: load the i-th data of the n pieces of data acquired by the decode operation module 109 to the $(2*((j-1)*n+i)-1)$-th input register 163 in the convolutional operation/fully connected operation module 110. Thus, the multiplier 164 in the convolutional operation/fully connected operation module 110 appropriately multiplies the data of the operation intermediate layer stored in the temporary storage area 106 by the filter data so that the convolutional operation and the fully connected operation become executable.

Step 215: proceed to step 216 when i≤n. Otherwise, proceed to step 217.

Step 216: update inner loop variable i as i=i+1.

Step 217: proceeds to step 218 when j≤m, and otherwise, terminate the decode processing flow of the filter data.

Second Embodiment

Figure 13:
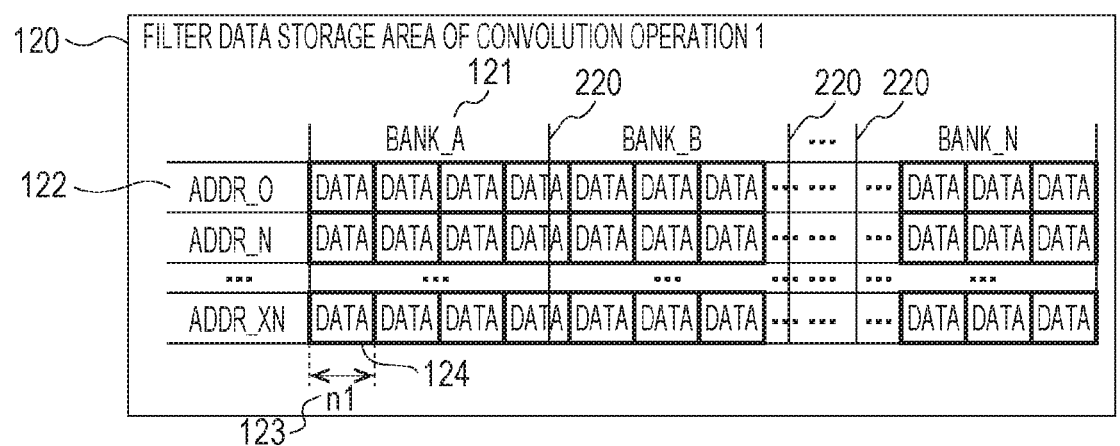
FIG. 13 is a conceptual diagram showing a form of change in the filter data storage area shown in FIG. 3.

FIG. 13 is a diagram showing a change form in the filter data storage area 120 shown in FIG. 3. As shown in FIG. 13, the filter data may cross an address boundary 220. If the operation control module 108 controls the data width n1, data can be cut out from each address 122 for each piece of data.

Third Embodiment

Figure 14:
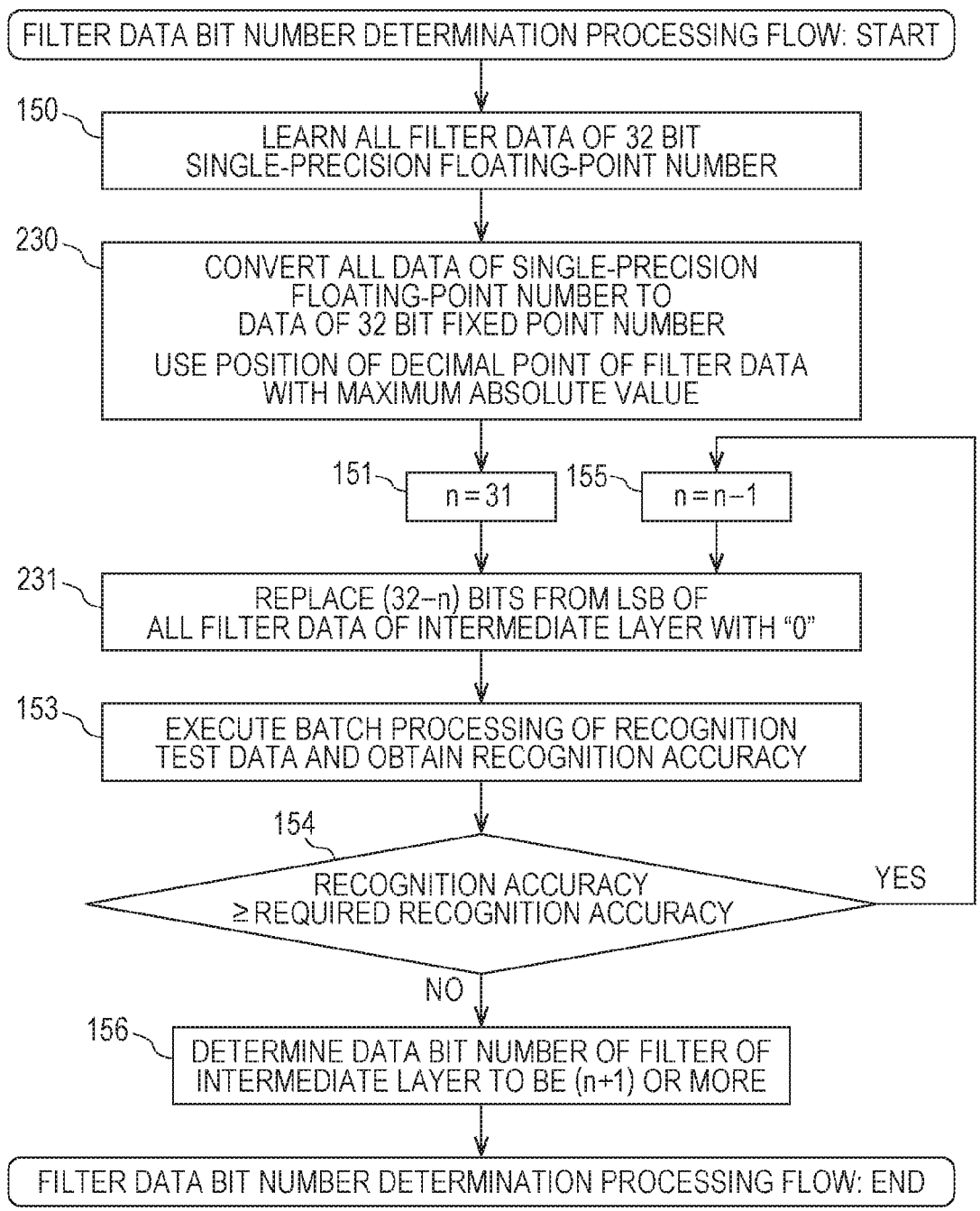
FIG. 14 is a flowchart showing another example of processing for determining the number of bits of the filter data shown in FIG. 6.

FIG. 14 is a diagram showing another example of the processing flow for determining the number of bits of the filter data shown in FIG. 6. Floating-point type filter data is used in the first embodiment. Fixed-point type filter data is used in the third embodiment.

Step 230: convert all the filter data focused on to 32 bit fixed-point numbers. In this case, for the position of the decimal point of the fixed-point number, the position of the decimal point of the number whose absolute value is maximum in all the filter data is used.

Step 231: reduce the numbers of operation bits in all the filter data of the intermediate layer being focused on to the operational precision. The (32−n) bits from the least significant bit (LSB) of the filter data of the 32 bit fixed-point data type obtained in step 230 are all set to "0". In this case, use the method of rounding to the nearest point as the rounding method of the filter data.

Fourth Embodiment

Figure 15:
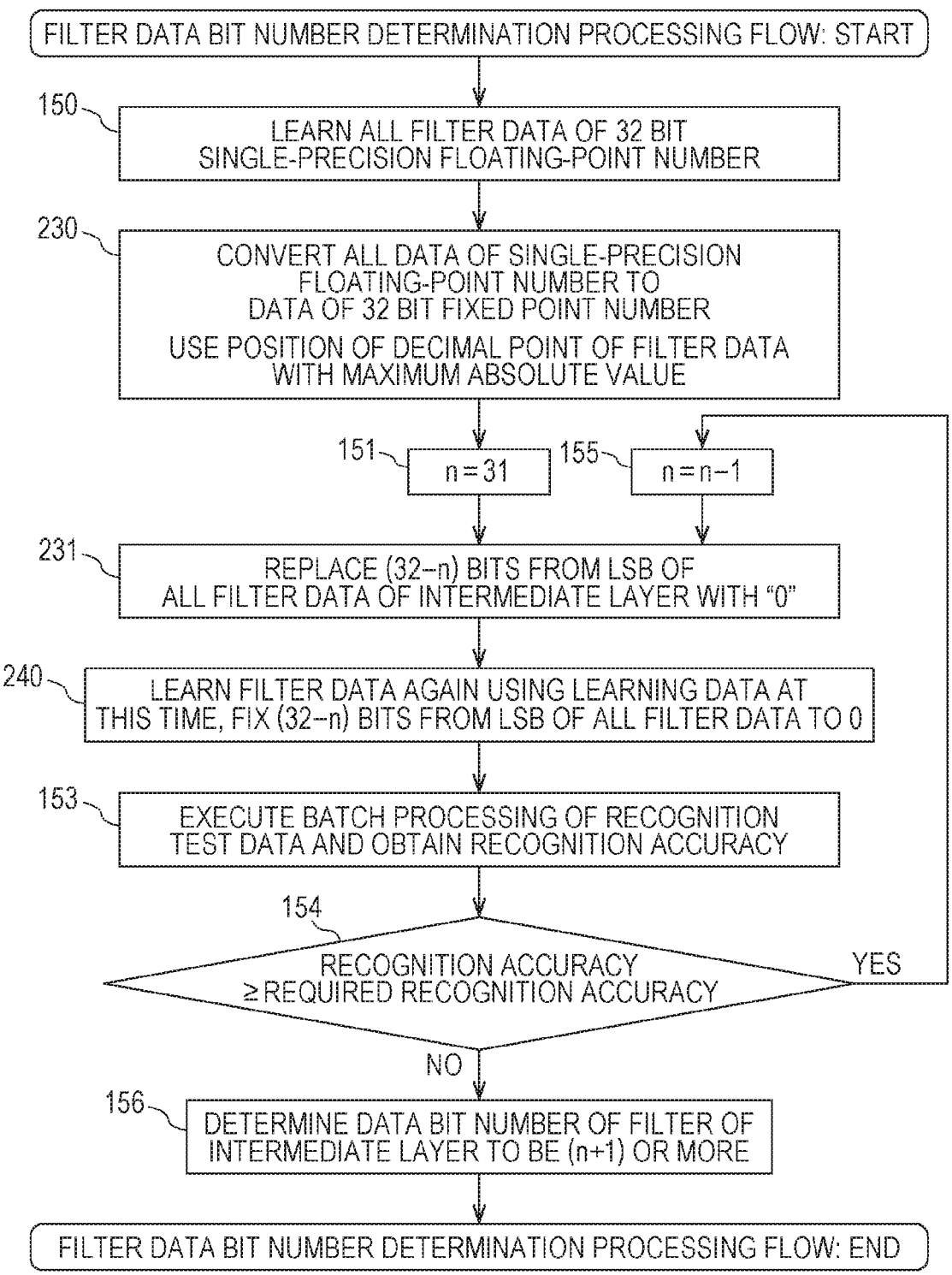
FIG. 15 is a flow chart showing a modification example of processing for determining the number of bits of the filter data shown in FIG. 14.

FIG. 15 is a diagram showing a change form in the processing flow for determining the number of bits of the filter data shown in FIG. 14, and includes the re-learning processing step 240.

Step 240: use a learning algorithm of the convolutional neural network to learn the filter data again. After learning, set all the (32−n) bits from the least significant bit (LSB) of the filter data to "0". In this case, use the method of rounding to the nearest point as the rounding method of the filter data.

The present invention is not limited to the embodiments described above, including various variations. For example, part of the configuration of an embodiment can be replaced with a configuration of another embodiment, and a configuration of another embodiment can also be added to the configuration of an embodiment. Furthermore, addition, deletion, or replacement of parts of the configurations can be carried out with respect to each embodiment and another embodiment.

What is claimed is:

1. An information processing apparatus comprising:
an input device for receiving data;
an operation unit which constitutes a convolutional neural network that performs processing of the data;
a storage area for storing data to be used in the operation unit; and
an output device for outputting a result of the processing, wherein
the convolutional neural network includes:
a first intermediate layer for performing a first processing including a first inner product operation; and
a second intermediate layer for performing a second processing including a second inner product operation, wherein
a bit width of first filter data for the first inner product operation and a bit width of second filter data for the second inner product operation differ from each other,
wherein the storage area includes a filter data storage area, and the filter data storage area comprises:
a first area for storing the first filter data having a first bit width; and
a second area, different from the first area, for storing the second filter data having a second bit width,
a bank configuration and address allocation in the first area are same as a bank configuration and address allocation in the second area, and
the first bit width and the second bit width are different from each other,
wherein the operation unit is configured to:
learn all filter data of 32 bit single-precision floating-point numbers to generate learning data;
convert the all filter data to 32 bit fixed point numbers;
replace 32−n bits from least significant bits of the all filter data of the first intermediate layer with a zero, where n is an integer greater than 0; and
learn the all filter data again using the learning data after the 32−n bits from the least significant bits have been replaced with the zero.

2. The information processing apparatus according to claim 1, wherein
the first intermediate layer is a convolution layer or a fully connected layer, and
the second intermediate layer is a convolution layer or a fully connected layer.

3. The information processing apparatus according to claim 1, wherein
the storage area stores the bit width of the first filter data and the bit width of the second filter data.

4. The information processing apparatus according to claim 1, wherein
the first intermediate layer has a larger number of parameters required for processing than the second intermediate layer, and the bit width of the first filter data for the first inner product operation is larger than the bit width of the second filter data for the second inner product operation.

5. The information processing apparatus according to claim 1, wherein
the first intermediate layer is located before the second intermediate layer, and
the bit width of the first filter data for the first inner product operation is larger than the bit width of the second filter data for the second inner product operation.

6. The information processing apparatus according to claim 1, wherein
the first intermediate layer is a layer for detecting an object by using color information for image data, and the second intermediate layer is a layer for edge detection of an object for the image data, and
the bit width of the first filter data for the first inner product operation is larger than the bit width of the second filter data for the second inner product operation.

7. The information processing apparatus according to claim 1, wherein
the information processing apparatus is configured by an FPGA,
the storage area is a semiconductor memory mounted on the FPGA, and
the operation unit is a programmable logic cell mounted on the FPGA.

8. An image recognition apparatus that classifies and identifies a type of an object in an image, the image recognition apparatus comprising:
an input device for receiving the image;
an operation unit for performing processing of the image;
a storage area for storing data to be used in the operation unit; and
an output device for outputting a result of the processing, wherein
the operation unit has a plurality of hierarchical layers for performing a convolutional operation of a filter for extracting a feature amount of the image, in order to process the image,
performs the convolutional operation in a subsequent hierarchical layer with respect to a result of the convolutional operation obtained in a previous hierarchical layer, and
determine data types of filter data to be used in the convolutional operation for each hierarchical layer so that the data types include at least two different data types, wherein
the storage area includes a filter data storage area for storing the filter data for each of the hierarchical layers,
a plurality of pieces of the filter data is stored in one address of the filter data storage area, and
a number of pieces of filter data stored in one address is not same for each hierarchical layer,
wherein the operation unit is configured to:
learn all filter data of 32 bit single-precision floating-point numbers to generate learning data;
convert the all filter data to 32 bit fixed point numbers;
replace 32−n bits from least significant bits of the all filter data of the previous hierarchical layer with a zero, where n is an integer greater than 0; and
learn the all filter data again using the learning data after the 32−n bits from the least significant bits have been replaced with the zero.

9. The image recognition apparatus according to claim 8, wherein
the filter data is used by a common convolution operator,
the convolution operator has a plurality of registers of fixed size for storing the filter data,
stores a plurality of filter data used for the convolutional operation to be performed in one hierarchical layer in one-to-one correspondence with the plurality of registers, and
stores a plurality of filter data used for the convolutional operation to be performed in another hierarchical layer in one-to-one correspondence with the plurality of registers,
so as to allow the common convolution operator to function as a hierarchical layer for performing different convolutional operations.

10. A method for setting a parameter of a convolutional neural network which receives data, executes processing of the data, and outputs a result of the processing, the method comprising:
performing, by a first intermediate layer of the convolutional neural network, a first inner product operation;
performing, by a second intermediate layer of the convolutional neural network, a second inner product operation;
independently setting a first bit width of first filter data for the first inner product operation and a second bit width of second filter data for the second inner product operation;
storing the first filter data in a first storage area; and
storing the second filter data in a second storage area, different from the first storage area;
wherein a bank configuration and address allocation in the first storage area are same as a bank configuration and address allocation in the second storage area; and
wherein the first bit width and the second bit width are different from each others;
learning all filter data of 32 bit single-precision floating-point numbers to generate learning data;
converting the all filter data to 32 bit fixed point numbers;
replacing 32−n bits from least significant bits of the all filter data of the first intermediate layer with a zero, where n is an integer greater than 0; and
learning the all filter data again using the learning data after the 32−n bits from the least significant bits have been replaced with the zero.

11. The method for setting a parameter of a convolutional neural network according to claim 10, wherein the independently setting comprises:
a first step of learning the first filter data for the first inner product operation and the second inner product operation by using the second filter data having a bit width of M bits so as to obtain first learned filter data having the bit width of M bits for the first inner product operation and second learned filter data having the bit width of M bits for the second inner product operation;
a second step of performing a first test by using the first filter data prepared by reducing the bit width of the first learned filter data so as to set the bit width of the first filter data based on the bit width of the first filter data at a time when a result of the processing in the first test satisfies a desired condition; and
a third step of performing a second test by using the second filter data prepared by reducing the bit width of the second learned filter data so as to set the bit width of the second filter data based on the bit width of the second filter data at a time when a result of the processing in the second test satisfies a desired condition.

12. The method for setting a parameter of a convolutional neural network according to claim 11, wherein
the second step comprises performing the first test using the first filter data prepared by reducing the bit width of the first learned filter data by reducing a lower bit of a decimal part, and
the third step comprises performing the second test using the second filter data prepared by reducing the bit width of the second learned filter data by reducing a lower bit of a decimal part.

13. The method for setting a parameter of a convolutional neural network according to claim 12, wherein,
a rounding method to a nearest point is used as a rounding method for reducing the lower bit of the decimal part of the first and second filter data.

* * * * *